United States Patent
Hsiao et al.

(10) Patent No.: US 10,586,313 B2
(45) Date of Patent: Mar. 10, 2020

(54) ELECTRONIC APPARATUS AND IMAGE PROCESSING METHOD FOR IMAGE EDGE ENHANCEMENT

(71) Applicant: REALTEK SEMICONDUCTOR CORP., Hsinchu (TW)

(72) Inventors: Ching-Ju Hsiao, Tainan (TW); Wen-Tsung Huang, Chiayi (TW)

(73) Assignee: REALTEK SEMICONDUCTOR CORP., Hsinchu (TW)

(*) Notice: Subject to any disclaimer, the term of this patent is extended or adjusted under 35 U.S.C. 154(b) by 30 days.

(21) Appl. No.: 16/059,607

(22) Filed: Aug. 9, 2018

(65) Prior Publication Data
US 2019/0130549 A1    May 2, 2019

(30) Foreign Application Priority Data

Oct. 30, 2017 (TW) .............................. 106137402 A (51) Int. Cl.
| | |
|---|---|
| *H04N 1/58* | (2006.01) |
| *G06T 5/40* | (2006.01) |
| *G06T 7/181* | (2017.01) |
| *G06T 5/00* | (2006.01) |
| *H04N 5/235* | (2006.01) |
| *G06T 7/13* | (2017.01) |

(52) U.S. Cl.
CPC .............. *G06T 5/40* (2013.01); *G06T 5/003* (2013.01); *G06T 5/008* (2013.01); *G06T 7/13* (2017.01); *G06T 7/181* (2017.01); *H04N 5/235* (2013.01); *G06T 2207/20192* (2013.01)

(58) Field of Classification Search
CPC .......... G06T 2207/20192; G06T 5/002; G06T 5/004; G06T 5/003; G06T 5/008; G06T 5/40; G06T 7/13; G06T 7/181
USPC ....... 382/266, 154, 112, 103, 167, 258, 300, 382/276
See application file for complete search history.

(56) References Cited

U.S. PATENT DOCUMENTS

| | | | |
|---|---|---|---|
| 7,386,186 B2 | 6/2008 | Ovsiannikov | |
| 2005/0104974 A1* | 5/2005 | Watanabe | H04N 1/6027 348/222.1 |
| 2007/0065036 A1* | 3/2007 | Chen | G06T 5/20 382/266 |
| 2008/0056600 A1* | 3/2008 | Wang | G06T 5/20 382/263 |
| 2010/0239173 A1* | 9/2010 | Yamada | G06T 5/003 382/199 |

(Continued)

FOREIGN PATENT DOCUMENTS

| | | |
|---|---|---|
| CN | 101727659 A | 6/2010 |
| TW | 200614810 A | 5/2006 |

*Primary Examiner* — Joseph Arevalo
(74) *Attorney, Agent, or Firm* — Li & Cai Intellectual Property (USA) Office (57) ABSTRACT

The present disclosure provides an electronic apparatus and an image processing method for image edge enhancement, which adjust each edge pixel located in an image edge of an input image. More specifically, the electronic apparatus and the image processing method adaptively adjust a present pixel that is taken as the edge pixel according to the position of the present pixel in the image edge and the input image, thereby outputting an adjusted pixel value. Accordingly, the electronic apparatus and the image processing method can enhance the image edge according to the actual image condition.

18 Claims, 8 Drawing Sheets

(56) References Cited

U.S. PATENT DOCUMENTS

| | | | |
|---|---|---|---|
| 2012/0288194 A1* | 11/2012 | Nakamura | H04N 1/4092 382/167 |
| 2013/0121611 A1* | 5/2013 | Moriya | G06T 3/403 382/266 |
| 2015/0262360 A1* | 9/2015 | Chen | H04N 17/002 348/187 |
| 2016/0300326 A1* | 10/2016 | Chiang | G06K 9/4604 |
| 2018/0182070 A1* | 6/2018 | Gal | G06T 5/008 |
| 2019/0014300 A1* | 1/2019 | Henry | H04N 9/43 |
| 2019/0156464 A1* | 5/2019 | Liu | G06K 9/6215 |

* cited by examiner

|  0 | -2 | -3 | -2 |  0 |
| -2 | -1 |  2 | -1 | -2 |
| -3 |  2 | 24 |  2 | -3 |
| -2 | -1 |  2 | -1 | -2 |
|  0 | -2 | -3 | -2 |  0 |

ELECTRONIC APPARATUS AND IMAGE PROCESSING METHOD FOR IMAGE EDGE ENHANCEMENT

BACKGROUND

1. Technical Field

The present disclosure relates to an electronic apparatus and an image processing method, and in particular, to an electronic apparatus and an image processing method for image edge enhancement.

2. Description of Related Art

Figure 1A:
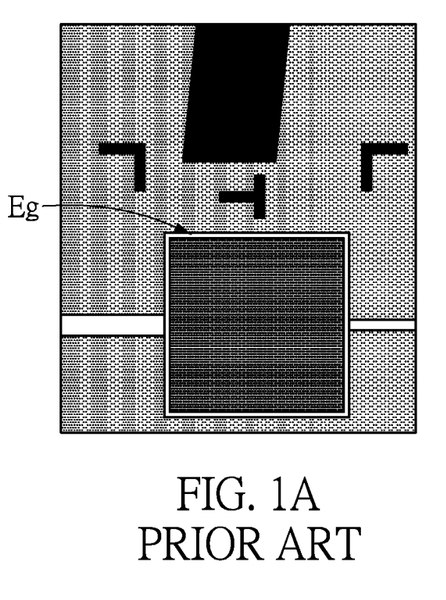
FIG. 1A shows a conventional diagram of an image processor detecting image edges.
Figure 1B:
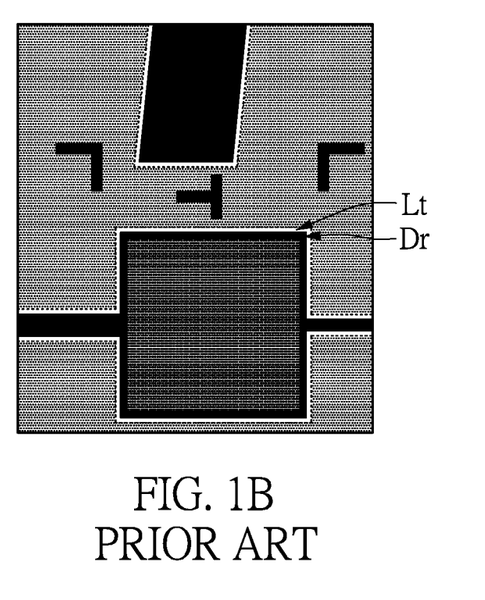
FIG. 1B shows a conventional diagram of an image processor executing edge enhancement.

To enhance the clarity of images, the image signal processor (ISP) enhances the edges of an input image to improve the image sharpness as perceived by the human eye. As shown in FIG. 1A, when the ISP executes the edge enhancement, it will make different adjustments for pixel values on both sides of the edge Eg. A side with higher pixel value is called a bright edge, and the enhanced bright edge is close to white. A side with lower pixel value is called a dark edge, and the enhanced dark edge is close to black. However, as shown in FIG. 1B, the enhanced bright edge Lt may have a pixel value that is much higher than surrounding pixels, so as to cause an unnatural white edge, i.e., an overshoot. Furthermore, the enhanced dark edge Dr may have a pixel value that is much lower than surrounding pixels, so as to cause an unnatural black edge, i.e., an undershoot.

While appropriate overshoot or undershoot can enhance the image sharpness, inappropriate overshoot or undershoot can make the image seem unnatural. Therefore, if the pixel values of the bright edge and those of the dark edge can be dynamically adjusted according to the image condition, an appropriate edge enhancement of the image will be achieved.

SUMMARY

Accordingly, an objective of the present disclosure is to provide an electronic apparatus and an image processing method for image edge enhancement, and which adjust each edge pixel located in an image edge of an input image. More specifically, the electronic apparatus and the image processing method adaptively adjust a present pixel that is taken as an edge pixel according to the position of the present pixel in the image edge and the input image, thereby outputting an adjusted pixel value. Accordingly, the electronic apparatus and the image processing method can enhance the image edge according to the actual image condition.

An exemplary embodiment of the present disclosure provides an image processing method. The image processing method is adapted for an electronic apparatus. The electronic apparatus is used for adjusting each edge pixel located in an image edge of an input image. The image processing method includes the following steps: (A) receiving each pixel of the input image; (B) when determining a present pixel as the edge pixel, calculating whether the present pixel is located in a bright edge or a dark edge of the image edge, and calculating a value to be enhanced of the present pixel; (C) adjusting the value according to an enhanced threshold value to generate an edge enhancement value; (D) determining whether the present pixel is located in an inside region or an outside region of the image edge, wherein the inside region is close to a mid-position of the image edge, and the outside region is distant from the mid-position of the image edge; (E) when the present pixel is located in the inside region, adjusting the edge enhancement value to generate an enhanced pixel value according to a first enhancement range, when the present pixel is located in the outside region, adjusting the edge enhancement value to generate an enhanced pixel value according to a second enhancement range, wherein the first enhancement range and the second enhancement range are related to the position of the present pixel located in the input image; and (F) when the present pixel is located in the bright edge, combining the present pixel value with the enhanced pixel value to be an adjusted pixel value and blending the adjusted pixel value and a largest pixel value around the present pixel according to a pixel ratio to generate an output pixel, and when the present pixel is located in the dark edge, combining the present pixel value with the enhanced pixel value to be an adjusted pixel value and blending the adjusted pixel value and a smallest pixel value around the present pixel according to the pixel ratio to generate the output pixel.

An exemplary embodiment of the present disclosure provides an electronic apparatus for image edge enhancement. The electronic apparatus is used for adjusting each edge pixel located in an image edge of an input image. The electronic apparatus includes an image capturing device and an image processor. The image capturing device is configured for receiving the input image and sequentially capturing each pixel of the input image. The image processor is electrically connected to the image capturing device and used for executing the following steps: (A) receiving each pixel of the input image; (B) when determining a present pixel as the edge pixel, calculating whether the present pixel is located in a bright edge or a dark edge of the image edge, and calculating a value to be enhanced of the present pixel; (C) adjusting the value according to an enhanced threshold value to generate an edge enhancement value; (D) determining the present pixel located in an inside region or an outside region of the image edge, wherein the inside region is close to a mid-position of the image edge, and the outside region is distant from the mid-position of the image edge; (E) when the present pixel is located in the inside region, adjusting the edge enhancement value to generate an enhanced pixel value according to a first enhancement range, when the present pixel is located in the outside region, adjusting the edge enhancement value to generate an enhanced pixel value according to a second enhancement range, wherein the first enhancement range and the second enhancement range are related to the position of the present pixel located in the input image; and (F) when the present pixel is located in the bright edge, combining the present pixel value with the enhanced pixel value to be an adjusted pixel value and blending the adjusted pixel value and a largest pixel value around the present pixel according to a pixel ratio to generate an output pixel, and when the present pixel is located in the dark edge, combining the present pixel value with the enhanced pixel value to be an adjusted pixel value and blending the adjusted pixel value and a smallest pixel value around the present pixel according to the pixel ratio to generate the output pixel.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or like parts.

Figure 2:
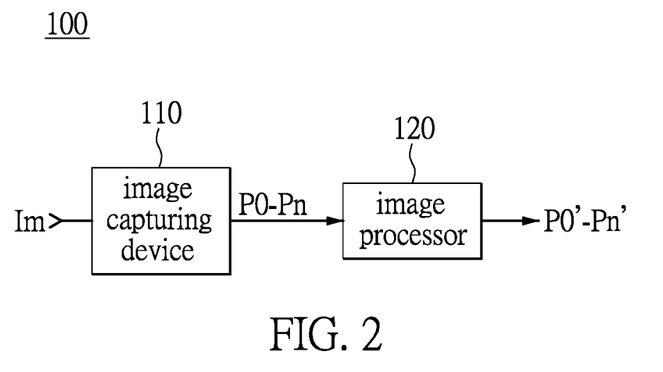
FIG. 2 shows a diagram of an electronic apparatus for image edge enhancement according to an embodiment of the present disclosure.

Firstly, please refer to FIG. 2, which shows a diagram of an electronic apparatus for image edge enhancement according to an embodiment of the present disclosure. As shown in FIG. 2, the electronic apparatus 100 receives each pixel P0-Pn of an input image Im and adjusts each edge pixel located in an image edge of the input image Im to generate the adjusted output images P0'-Pn'. In the present disclosure, the electronic apparatus 100 can be a smart phone, a video recorder, a tablet computer, a notebook computer, or any electronic apparatus needing image edge enhancement, but is not limited thereto.

The electronic device 100 includes an image capturing device 110 and an image processor 120. As shown in FIG. 2, the image capturing device 110 receives the input image Im and sequentially captures a plurality of pixels P0-Pn of the input image Im. More specifically, the image capturing device 110 captures continuous images, and the input image Im is one of the continuous images. The input image Im is composed of the pixels P0-Pn.

Figure 4:
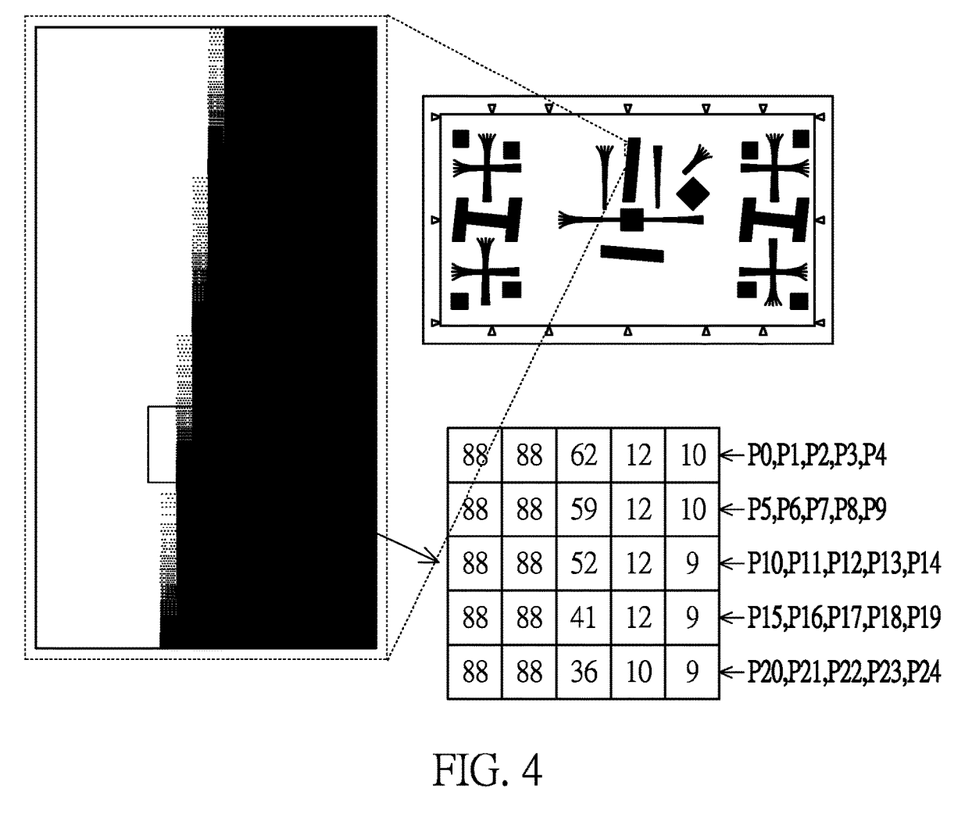
FIG. 4 shows a diagram of a present pixel and surrounding pixels according to an embodiment of the present disclosure.
Figure 5A:
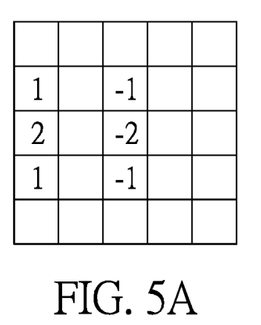
FIGS. 5A-5C show diagrams of masks arranged in a vertical direction according to an embodiment of the present disclosure.
Figure 5B:
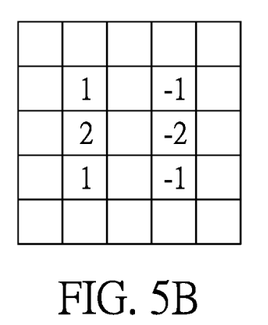
Figure 5C:
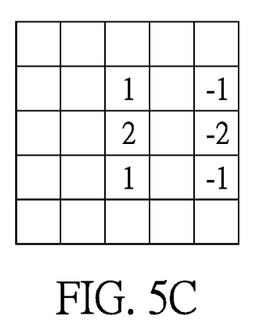
Figure 6A:
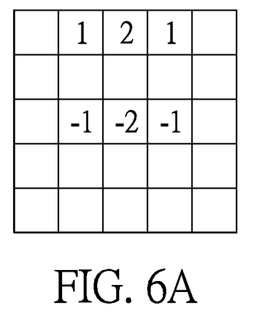
FIGS. 6A-6C show diagrams of masks arranged in a horizontal direction according to an embodiment of the present disclosure.
Figure 6B:
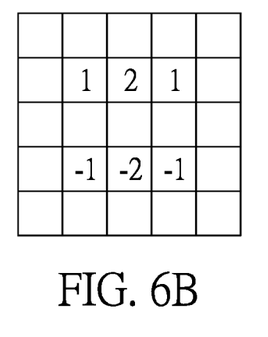
Figure 6C:
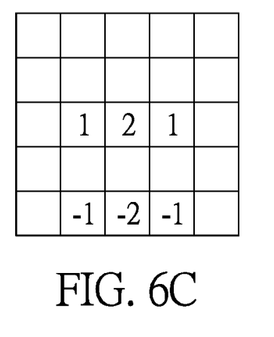
Figure 7A:
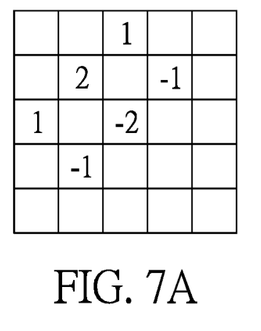
FIGS. 7A-7C show diagrams of masks arranged in a positive diagonal direction according to an embodiment of the present disclosure.
Figure 7B:
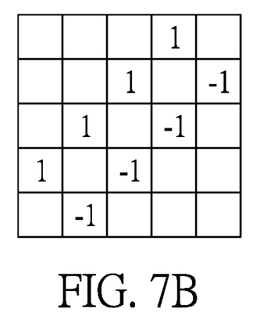
Figure 7C:
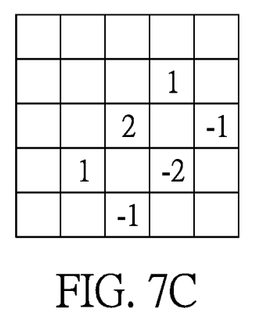
Figure 8A:
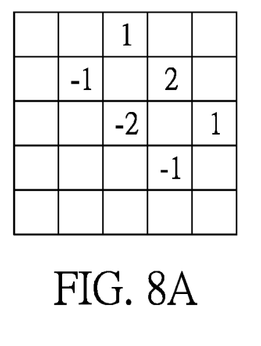
FIGS. 8A-8C show diagrams of masks arranged in a negative diagonal direction according to an embodiment of the present disclosure.
Figure 8B:
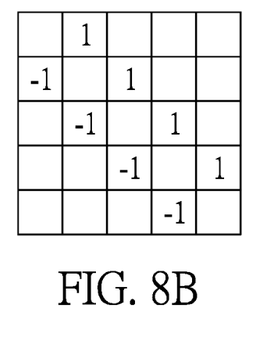
Figure 8C:
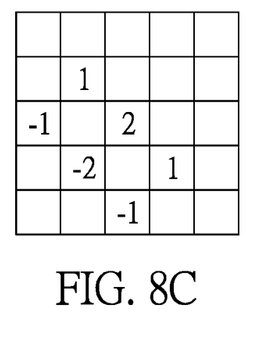

The image processor 120 is electrically connected to the image capturing device 110 and executes the following steps to adjust a present pixel that is taken as the edge pixel according to the position of the present image in the image edge and in the input image, thereby enhancing the image edge of the input image. As shown in FIG. 4, taking the pixel P12 and the surrounding pixels P0, P1, P2, P3, P4, P5, P6, P7, P8, P9, P10, P11, P13, P14, P15, P16, P17, P18, P19, P20, P21, P22, P23, and P24 (i.e., the surrounding pixels of the 5*5 mask formed around the pixel P12) of the input image Im as an example, the pixel P12 is one of the edge pixels in the image edge of the input image Im. Persons of ordinary skill in the art should be able to derive the steps for adjusting each pixel P0-Pn as the edge pixel from the steps of adjusting the pixel P12.

Figure 3:
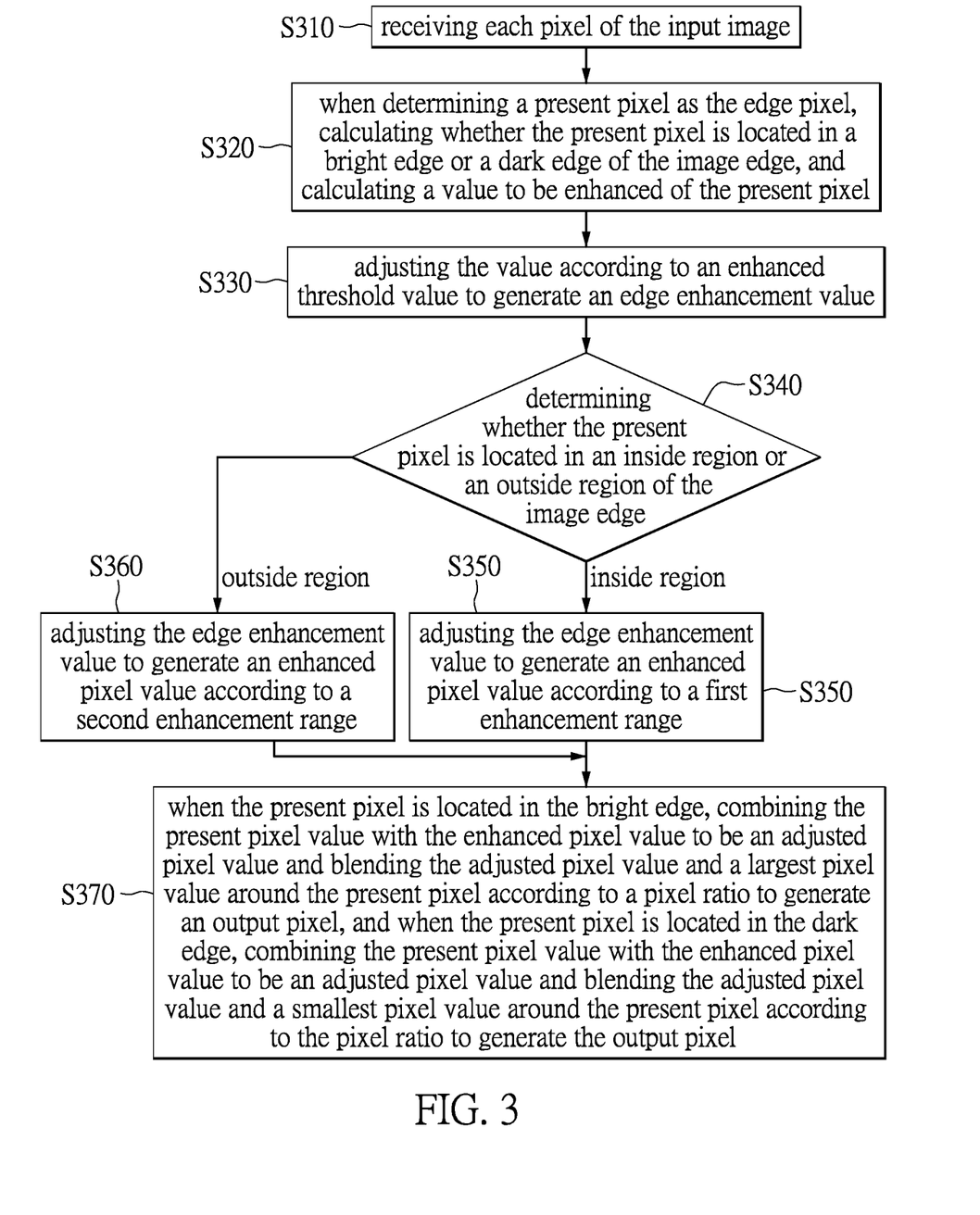
FIG. 3 shows a flowchart of an image processing method according to an embodiment of the present disclosure.

Referring to FIGS. 2-4, FIG. 3 shows a flowchart of an image processing method according to an embodiment of the present disclosure. Firstly, the image processor 120 receives each pixel P0-Pn of the input image Im to further analyze features related to the image edge in the input image Im (the step S310). More specifically, the image processor 120 takes each pixel P0-Pn as the present pixel in sequence and calculates edge gradient values of the present pixel Im in multiple directions. Then, the image processor 120 determines whether the present pixel is located in the image edge according to the edge gradient values. When the present pixel is not located in the image edge, the image processor 120 takes the next pixel as the present pixel and re-determines whether the present pixel is located in the image edge. Otherwise, when the present pixel is located in the image edge, the image processor 120 executes the next step S320.

In the present disclosure, the image processor 120 takes the pixel P12 as the present pixel and calculates the edge gradient values in a vertical direction, a horizontal direction, a positive diagonal direction, and a negative diagonal direction. As shown in FIG. 4, the value of the pixel P12 is 52, and the values of the surrounding pixels P0-P11, P13-P24 around the pixel P12 are respectively 88, 88, 62, 12, 10, 88, 88, 59, 12, 10, 88, 88, 12, 9, 88, 88, 41, 12, 9, 88, 88, 36, 10, 9. FIGS. 5A-5C, 6A-6C, 7A-7C, and 8A-8C respectively show masks in the vertical direction, the horizontal direction, the positive diagonal direction, and the negative diagonal direction.

Therefore, the image processor 120 respectively calculates the edge gradient values of the present pixel P12 on the masks in the vertical direction, the horizontal direction, the positive diagonal direction, and the negative diagonal direction. At present, the edge gradient value $Gv$ in the vertical direction is $Gv=|88+176+88-59-104-41|+|88+176+88-12-24-12|+|59+104+41-10-18-9|=148+304+167=619$;

the edge gradient value $Gh$ in the horizontal direction is $Gh=|88+124+12-88-104-12|+|88+118+12-88-82-12|+|88+104+12-88-72-101|=20+36+34=90$; the edge gradient value $Gdp$ in the positive diagonal direction is $Gdp=|88+176+62-88-104-12|+|88+88+59+12-88-41-12-10|+|88+104+12-36-12-9|=122+96+147=365$; and the edge gradient value Gdn in the negative diagonal direction is Gdn=|62+24+9−88−104−12|+|88+59+12+9−88−88−41−10|+|88+104+12−88−176−36|=109+59+96=264.

Next, the image processor 120 determines whether the present pixel P12 is located in the image edge according to the edge gradient values Gv, Gh, Gdp, and Gdn. When one of the edge gradient values Gv, Gh, Gdp, and Gdn is more than a predefined gradient value (e.g., the value is 300), it indicates that the present pixel P12 is located in the image edge. When any one of the edge gradient values Gv, Gh, Gdp, and Gdn is not more than the predefined gradient value, it indicates that the present pixel P12 is not located in the image edge. Therefore, the image processor 120 determines that the present image P12 is located in the image edge. However, the determination of whether the present pixel P12 is located in the image edge by the image processor 120 can also be performed by other methods, and is not limited to the present disclosure.

Next, in the step S320, the image processor 120 calculates that the present pixel P12 is located in a bright edge or in a dark edge of the image edge and then calculates a value to be enhanced of the present pixel P12 (the step S320). More specifically, the image processor 120 calculates an edge response value of the present pixel P12 according to a response mask to determine whether the present pixel P12 is located in the bright edge or the dark edge of the image edge.

Figure 9:
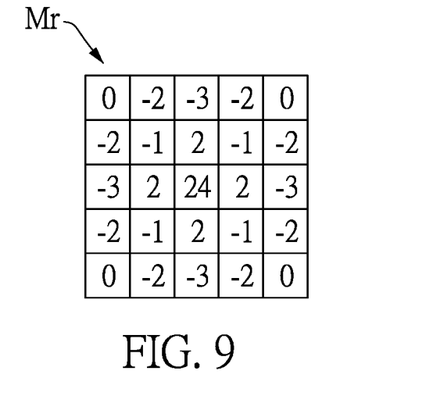
FIG. 9 shows a diagram of masks that calculate edge-response values according to an embodiment of the present disclosure.

In the present disclosure, the response mask is shown in FIG. 9, the image processor 120 calculates the edge response value of the present pixel P12 according to the response mask Mr to determine whether the present pixel P12 is located in the bright edge or the dark edge of the image edge. More specifically, when the edge response value is more than or equal to 0, the image processor 120 determines that the present pixel is located in the bright edge. Otherwise, when the edge response value is less than 0, the image processor 120 determines that the present pixel is located in the dark edge. Therefore, the edge response value of the present pixel P12=52*24+(59+88+41+12)*2+(88+88+12+12)*(−1)+(88+12+10+9+10+88+88+88)*(−2)+(62+9+36+88)*(−3)=1248+400+(−200)+(−786)+(−585)=77. The edge response value of the present pixel P12 is more than 0. The image processor 120 determines that the present pixel P12 is located in the bright edge.

With respect to the calculation of the value to be enhanced of the present pixel P12 by the image processor 120, persons of ordinary skill in the art should understand relevant operations, so that detailed description thereof is omitted herein. It is worth noting that the value to be enhanced is not adjusted based on the position of the present pixel in the image edge and in the input image. If the image processor 120 adjusts the present pixel according to the value to be enhanced, the image processor 120 would execute improper positive/negative pulses which cause the image to appear unnatural. In the present disclosure, the value to be enhanced Si of the present pixel P12 is 20.

Therefore, the image processor 120 adjusts the value according to an enhanced threshold value to generate an edge enhancement value (the step S330). More specifically, when the present pixel P12 is located in the bright edge, the image processor 120 calculates a gradient sum according to the edge gradient value and calculates the enhanced threshold value according to the gradient sum. The gradient sum is related to the intensity of the bright edge of the present pixel. The image processor 120 can select the aforementioned edge gradient value based on the actual situation to calculate the gradient sum. The following is an example based on the circumstance that the image processor 120 selects the edge gradient value Gh in the horizontal direction and the edge gradient value Gv in the vertical direction. In the present disclosure, the gradient sum Gtotal=(Gv+Gh)/A1=(619+90)/32=22. A1 indicates the accuracy of the gradient sum Gtotal, and users may adjust the gradient sum Gtotal based on the actual situations.

Figure 10A:
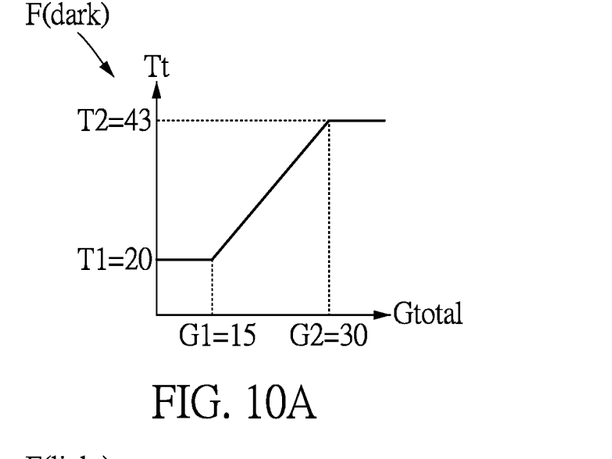
FIG. 10A shows a functional diagram of a gradient sum and an enhanced threshold value when a present pixel is located in a dark edge according to an embodiment of the present disclosure.

As shown in FIG. 10A, when the present pixel is located in the dark edge, the image processor 120 calculates the enhanced threshold value Tt by a dark edge enhancement function F(dark). The dark edge enhancement function F(dark) indicates the relationship between the gradient sum Gtotal and the enhanced threshold value Tt. In the dark edge enhancement function F(dark), when the gradient sum Gtotal is less than a gradient lower limit value G1 (being 15 in the present embodiment), the enhanced threshold value Tt maintains an enhanced lower limit value T1 (being 20 in the present embodiment). When the gradient sum Gtotal is more than or equal to a gradient upper limit value G2 (being 30 in the present embodiment), the enhanced threshold value Tt maintains an enhanced lower upper value T2 (being 43 in the present embodiment). When the gradient sum Gtotal is between the gradient lower limit value G1 and the gradient upper limit value G2, the enhanced threshold value Tt linearly changes according to the gradient sum Gtotal. In the dark edge enhancement function F(dark), the relationship between the gradient sum Gtotal and the enhanced threshold value Tt can be designed according to particular implementation, and is not limited to that disclosed herein.

Figure 10B:
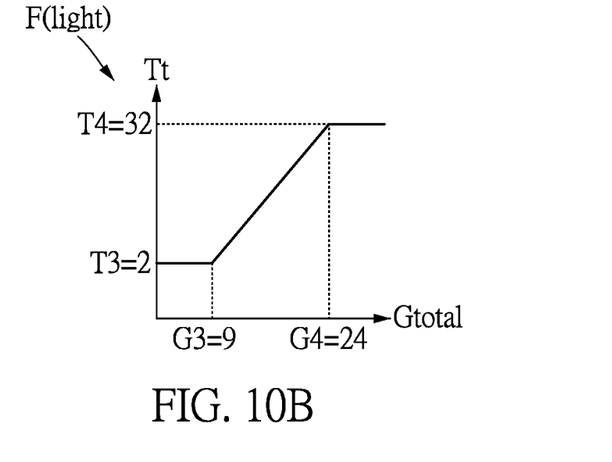
FIG. 10B shows a functional diagram of a gradient sum and an enhanced threshold value when a present pixel is located in a bright edge according to an embodiment of the present disclosure.

Similarly, as shown in FIG. 10B, when the present pixel is located in the bright edge, the image processor 120 calculates the enhanced threshold value Tt by a bright edge enhancement function F(light). The bright edge enhancement function F(light) indicates the relationship between the gradient sum Gtotal and the enhanced threshold value Tt. In the bright edge enhancement function F(light), when the gradient sum Gtotal is less than a gradient lower limit value G3 (being 9 in the present embodiment), the enhanced threshold value Tt maintains an enhanced lower limit value T3 (being 2 in the present embodiment). When the gradient sum Gtotal is more than or equal to a gradient upper limit value G4 (being 24 in the present embodiment), the enhanced threshold value Tt maintains an enhanced lower upper value T4 (being 32 in the present embodiment). When the gradient sum Gtotal is between the gradient lower limit value G3 and the gradient upper limit value G4, the enhanced threshold value Tt linearly changes according to the gradient sum Gtotal. In the bright edge enhancement function F(light), the relationship between the gradient sum Gtotal and the enhanced threshold value Tt can be designed according to particular implementation, and is not limited to that disclosed herein.

In continuation of the example above, in the present disclosure, the present pixel P12 is located in the bright edge, the gradient sum Gtotal is 22, and the value to be enhanced Si is 20. Therefore, the image processor 120 calculates the enhanced threshold value Tt=(22−9)*(32−2)/(24−9)+2=28 according to the bright edge enhancement function F(light) to limit the value to be enhanced Si of the present pixel P12. When the value to be enhanced Si is more than the enhanced threshold value Tt, the image processor 120 decreases the value to be enhanced Si to the enhanced threshold value Tt to generate the edge enhancement value Si'. When the value to be enhanced Si is less than or equal to the enhanced threshold value Tt, the image processor 120 takes the value to be enhanced Si as the edge enhancement value Si'. In the present disclosure, the value to be enhanced Si of the present pixel P12 is 20. Therefore, the edge enhancement value Si' of the image processor 120 is 20.

Therefore, the image processor 120 adaptively adjusts the value to be enhanced Si of the present pixel according to the present pixel located in the dark edge or the bright edge to generate the edge enhancement value Si', so as to avoid producing improper positive/negative pulses. Furthermore, for the input image, the brightness at the middle position is greater than that at the corners. Therefore, the image processor 120 further considers the position of the present pixel in the input image to provide better image edge enhancement. The steps S340-S370 of the present disclosure will be described in the following paragraph.

In the step S340, the image processor 120 determines whether the present pixel is located in an inside region or an outside region of the image edge. The inside region is close to a mid-position of the image edge and the outside region is distant from the mid-position of the image edge. When the image processor 120 determines that the present pixel is located in the inside region, the image processor 120 executes the step S350. When the image processor 120 determines that the present pixel is located in the outside region, the image processor 120 executes the step S360.

More specifically, when the present pixel is located in the bright edge of the image edge, the image processor 120 determines whether a determination value generated by adding the present pixel and the edge enhancement value Si' is more than the largest pixel value around the present pixel. If yes, it indicates that the present pixel is located in the outside region of the image edge. If not, it indicates that the present pixel is located in the inside region of the image edge. The term "around" the present pixel P12 is taken to mean a range extending out from the present pixel P12 by a predetermined number of pixels. In the present disclosure, this range extends out around the present pixel P12 to form a 5*5 pixel field, such as the pixels P0-P24 shown in FIG. 4.

Similarly, when the present pixel is located in the dark edge of the image edge, the image processor 120 determines whether a determination value generated by subtracting the edge enhancement value Si' from the present pixel is less than the smallest pixel value around the present pixel. If yes, it indicates that the present pixel is located in the outside region of the image edge. If not, it indicates that the present pixel is located in the inside region of the image edge.

In the aforementioned examples, the present pixel P12 is located in the bright edge of the image edge, and the edge enhancement value Si' of the present pixel P12 is 20. At this time, the image processor 120 determines that the determination value (=52+20=72) is less than the largest pixel value (88) around the present pixel P12, which indicates that the present pixel P12 is located in the inside region of the image edge.

In the step S350, when the present pixel is located in the inside region, the image processor 120 adjusts the edge enhancement value Si' according to a first enhancement range to generate an enhanced pixel value and then executes the step S370. More specifically, when the present pixel is located in the inside region, the image processor 120 sets an inside enhancement range ENin and adjusts the inside enhancement range ENin according to a distance difference between the present pixel and a central position of the input image to generate a first enhancement range ENin_final. The inside enhancement range ENin is a reference value. Users can set the inside enhancement range ENin in advance by the image processor 120.

Figure 11:
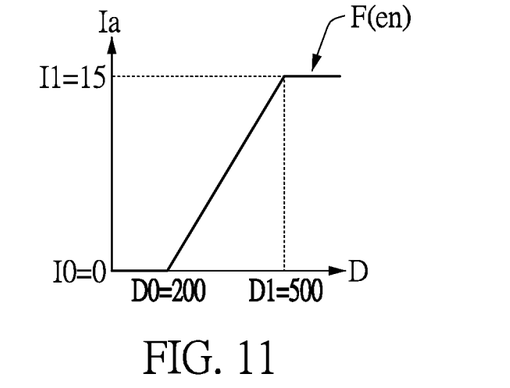
FIG. 11 is a functional diagram showing a first enhanced degree and a second enhanced degree being adjusted according to an embodiment of the present disclosure.

As shown in FIG. 11, in the present disclosure, the image processor 120 is calculated by an inside and outside enhancement function F(en) to adjust the inside enhancement range ENin according to the distance difference D between the present pixel and the central position of the input image, thereby generating the first enhancement range ENin_final. The inside and outside enhancement function F(en) indicates the relationship between the distance difference D and an adjustment range Ia.

In the inside and outside enhancement function F(en), when the distance difference D is less than or equal to a distance lower limit value D0 (being 200 in the present embodiment), it indicates that the present pixel is close to the central position of the input image. At this time, the adjustment range Ia maintains an adjusted lower limit value I0 (being 0 in the present embodiment, i.e., no adjustment is performed). When the distance difference D is more than or equal to a distance upper limit value D1 (e.g., 500 in the embodiment), it indicates that the present pixel is far from the central position of the input image. At this time, the adjustment range Ia maintains an adjusted upper limit value I1 (e.g., 15 in the embodiment). When the distance difference D is between the distance lower limit value D0 and the distance upper limit value D1, the adjustment range Ia changes linearly according to the distance difference D. In the inside and outside enhancement function F(en), the relationship between the distance difference D and the adjustment range Ia can be designed according to particular implementation, and the present disclosure is not limited thereto.

In the aforementioned examples, the present pixel P12 is located in the inside region, and the inside enhancement range ENin is set to 2. When the image size of the input image Im is 1280*720 and the coordinates of the present pixel P12 is (621, 158), the image processor 120 would calculate the distance difference D between the present pixel P12 and the central position of the input image as |158−720/2|+|621−1280/2|=202+19=221. As shown in FIG. 11, the image processor 120 calculates the adjustment range Ia=(221−200)*(15−0)/(500−200)+0=1.05 according to the distance difference D. Then, the inside enhancement range ENin adds the adjustment range Ia (i.e., 2+1.05) to adjust the inside enhancement range ENin, thereby producing the first enhancement range ENin_final as 3.05.

Next, the image processor 120 adjusts the edge enhancement value Si' to generate an enhanced pixel value S_final according to the first enhancement range ENin_final. More specifically, the image processor 120 normalizes the first enhancement range ENin_final, i.e., (1+ENin_final)/precision value (e.g., 8 in the embodiment). Next, the image processor 120 multiplies the edge enhancement value Si' by the normalized first enhancement range ENin' to generate the enhanced pixel value S_final. From the aforementioned examples, the enhanced pixel value S_final=Si'*ENin'=20*(1+3.05/8)=27.

Similarly, in the step S360, when the present pixel is located in the outside region, the image processor 120 adjusts the edge enhancement value Si' according to a second enhancement range to generate an enhanced pixel value and then executes the step S370. More specifically, when the present pixel is located in the outside region, the image processor 120 sets an outside enhancement range ENout and adjusts the outside enhancement range ENout according to a distance difference between the present pixel and a central position of the input image to generate a second enhancement range ENout_final. The outside enhancement range ENout is a reference value. Users can set the outside enhancement range ENout in advance by the image processor 120.

As shown in FIG. 11, in the present disclosure, the image processor 120 is calculated by an inside and outside enhancement function F(en) to adjust the outside enhancement range ENout according to the distance difference D between the present pixel and the central position of the input image, thereby generating the second enhancement range ENout_final. The inside and outside enhancement functions F(en) indicates the relationship between the distance difference D and an adjustment range Ia. Details on the implementation of the inside and outside enhancement functions F(en) have been described in the step S350, so that further description thereof is omitted herein.

For example, a present pixel P0 is located in the dark edge of the image edge. The edge enhancement value Si' is set to 9 and the outside enhancement range ENout is set to 3. When the image size of the input image Im is 1280*720 and the coordinates of the present pixel P0 is (619, 156), the image processor 120 would calculate the distance difference D between the present pixel P0 and the central position of the input image as |156−720/2|+|619−1280/2|=204+21=225. As shown in FIG. 11, the image processor 120 calculates the adjustment range Ia=(225−200)*(15−0)/(500−200)+0=1.25 according to the distance difference D. Then, the outside enhancement range ENout adds the adjustment range Ia (i.e., 3+1.25) to adjust the outside enhancement range ENout, thereby producing the second enhancement range ENout_final as 4.25.

Next, the image processor 120 adjusts the edge enhancement value Si' to generate the enhanced pixel value S_final according to the second enhancement range ENout_final. More specifically, the image processor 120 normalizes the second enhancement range ENout_final, i.e., (1+ENout_final)/precision value (e.g., 8 in the embodiment). Next, the image processor 120 multiplies the edge enhancement value Si' by the normalized second enhancement range ENout' to generate the enhanced pixel value S_final. From the aforementioned examples, the enhanced pixel value S_final=Si'*ENout'=9*(1+4.25/8)=14.

Therefore, the image processor 120 can adaptively adjust the enhanced pixel value S_final according to the present pixel located in an inside region or an outside region and located in the position of the input image Im to avoid the generation of inappropriate positive/negative pulses, thereby providing better image edge enhancement.

In the step S370, when the present pixel P12 is located in the dark edge, the image processor 120 combines the present pixel P12 value with the enhanced pixel value S_final to be an adjusted pixel value and blends the adjusted pixel value and a smallest pixel Pmin around the present pixel P12 according to a pixel ratio Rb to generate the output pixel P12'. In the present disclosure, the output pixel P12' can be represented by the algorithm (1) below.

$$P12'=(1-Rb)*(P12+S\_final)+Rb*Pmin \quad \text{algorithm (1)}$$

In the algorithm, the sum of the present pixel P12 and the enhanced pixel value S_final represents the adjusted pixel value. Pmin is the smallest pixel around the present pixel P12. Rb is the pixel ratio, and can be set according to particular implementation.

When the present pixel P12 is located in the bright edge, the image processor 120 combines the present pixel P12 with the enhanced pixel value S_final to be an adjusted pixel value and blends the adjusted pixel value and a largest pixel value Pmax around the present pixel P12 according to a pixel ratio Rb to generate the output pixel P12' value. In the present disclosure, the output pixel P12' can be represented by the algorithm (2) below.

$$P12'=(1-Rb)*(P12+S\_final)+Rb*Pmax \quad \text{algorithm (2)}$$

In the algorithm, the sum of the present pixel P12 and the enhanced pixel value S_final represents the adjusted pixel value. Pmax is the largest pixel value around the present pixel P12. Rb is the pixel ratio, and can be set according to particular implementation.

Figure 12A:
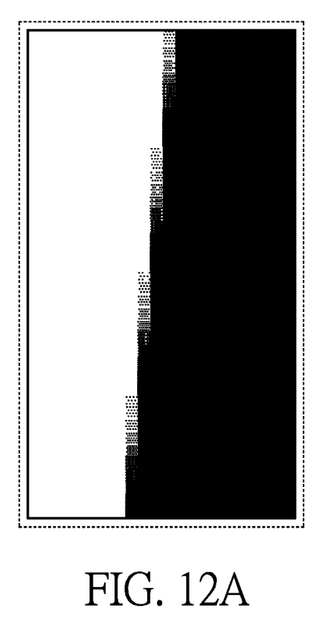
FIGS. 12A-12C show diagrams of different pixel ratios according to an embodiment of the present disclosure.
Figure 12B:
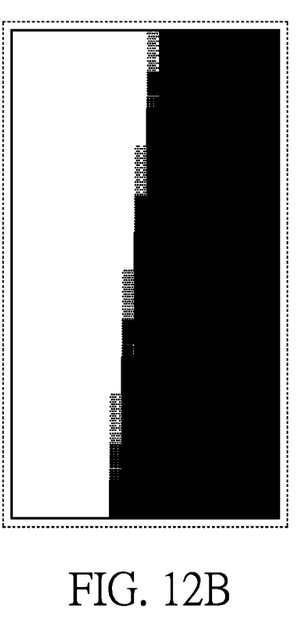
Figure 12C:
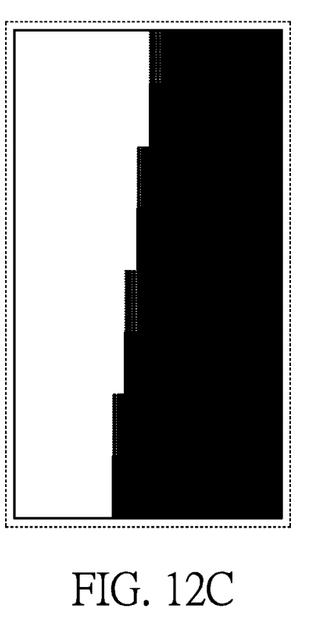

In the aforementioned examples, the present pixel P12 is located in the bright edge. The enhanced pixel value S_final of the present pixel P12 is 27, and the pixel ratio Rb is set to 0. Therefore, the output pixel P12'=(1−Rb)*(P12+S_final)+Rb*Pmax=(1−0)*(52+27)+0*88=79. FIGS. 12A, 12B, and 12C show that the output pixel P12' is in different pixel ratio Rb (e.g., 0, 0.5, and 1 sequentially) conditions. Therefore, users can set the pixel ratio Rb according to a suitable image edge enhancement method.

In summary, the present disclosure provides an electronic apparatus and an image processing method for image edge enhancement, which adaptively adjust the present pixel that is taken as the edge pixel according to the position of the present pixel in the image edge and the input image, thereby outputting an adjusted pixel value. Accordingly, the electronic apparatus and the image processing method can enhance the image edge according to the actual image condition.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. An image processing method, adapted for an electronic apparatus, used for adjusting each edge pixel located in an image edge of an input image, the image processing method comprising:
    (A) receiving each pixel of the input image;
    (B) when determining a present pixel as the edge pixel, calculating whether the present pixel is located in a bright edge or a dark edge of the image edge, and calculating a value to be enhanced of the present pixel;
    (C) adjusting the value according to an enhanced threshold value to generate an edge enhancement value;
    (D) determining whether the present pixel is located in an inside region or an outside region of the image edge, wherein the inside region is close to a mid-position of the image edge, and the outside region is distant from the mid-position of the image edge;
    (E) when the present pixel is located in the inside region, adjusting the edge enhancement value to generate an enhanced pixel value according to a first enhancement range, when the present pixel is located in the outside region, adjusting the edge enhancement value to generate an enhanced pixel value according to a second enhancement range, wherein the first enhancement range and the second enhancement range are related to the position of the present pixel located in the input image; and
    (F) when the present pixel is located in the bright edge, combining the present pixel value with the enhanced pixel value to be an adjusted pixel value and blending the adjusted pixel value and a largest pixel value around the present pixel according to a pixel ratio to generate an output pixel, and when the present pixel is located in the dark edge, combining the present pixel value with the enhanced pixel value to be an adjusted pixel value and blending the adjusted pixel value and a smallest pixel value around the present pixel according to the pixel ratio to generate the output pixel; wherein after the step (A), the method further includes: taking each pixel as the present pixel in sequence; calculating edge gradient values of the present pixel in multiple directions; determining whether the present pixel is located in the image edge according to the edge gradient value; executing the step (B) when the present pixel located in the image edge; and taking the next pixel as the present pixel and re-determining whether the present pixel is located in the image edge when the present pixel is not located in the image edge.

2. The image processing method according to claim 1, wherein the step (B) of calculating whether the present pixel is located in the bright edge or the dark edge of the image edge further includes:
calculating an edge response value of the present pixel according to a response mask to determine whether the present pixel is located in the bright edge or the dark edge of the image edge.

3. The image processing method according to claim 1, wherein the step (C) further includes: calculating a gradient sum according to the edge gradient value when the present pixel is located in the bright edge, wherein the gradient sum is related to the intensity of the bright edge of the present pixel; and calculating the enhanced threshold value according to the gradient sum.

4. The image processing method according to claim 1, wherein the step (C) further includes: calculating a gradient sum according to the edge gradient value when the present pixel is located in the dark edge, wherein the gradient sum is related to the intensity of the dark edge of the present pixel; and calculating the enhanced threshold value according to the gradient sum.

5. The image processing method according to claim 1, wherein the step (D) further includes:
determining whether a determination value generated by adding the present pixel and the edge enhancement value is more than the largest pixel value around the present pixel when the present pixel located in the bright edge of the image edge;
if yes, it indicates that the present pixel is located in the outside region of the image edge; and
if not, it indicates that the present pixel is located in the inside region of the image edge.

6. The image processing method according to claim 5, wherein in the step of determining whether the edge enhancement value is more than the largest pixel value around the present pixel, being around the present pixel indicates being within a range extending out from the present pixel by a predetermined number of pixels.

7. The image processing method according to claim 1, wherein the step (D) further includes:
determining whether a determination value generated by subtracting the edge enhancement value from the present pixel is less than the smallest pixel value around the present pixel when the present pixel is located in the dark edge of the image edge;
if yes, it indicates that the present pixel is located in the outside region of the image edge; and
if not, it indicates that the present pixel is located in the inside region of the image edge.

8. The image processing method according to claim 7, wherein in the step of determining whether the edge enhancement value is less than the smallest pixel value around the present pixel, being around the present pixel indicates being within a range extending out from the present pixel by a predetermined number of pixels.

9. The image processing method according to claim 1, wherein the step (E) further includes:
setting an inside enhancement amplitude and adjusting the inside enhancement amplitude according to a distance difference between the present pixel and a central position of the input image to generate a first enhancement amplitude when the present pixel is located in the inside region.

10. The image processing method according to claim 1, wherein the step (E) further includes:
setting an outside enhancement amplitude and adjusting the outside enhancement amplitude according to a distance difference between the present pixel and a central position of the input image to generate a second enhancement amplitude when the present pixel is located in the outside region.

11. An electronic apparatus for image edge enhancement, used for adjusting each edge pixel located in an image edge of an input image, the electronic apparatus comprising: an image capturing device configured for receiving the input image and sequentially capturing each pixel of the input image; an image processor electrically connected to the image capturing device and used for executing the following steps:
(A) receiving each pixel of the input image;
(B) when determining a present pixel as the edge pixel, calculating whether the present pixel is located in a bright edge or a dark edge of the image edge, and calculating a value to be enhanced of the present pixel;
(C) adjusting the value according to an enhanced threshold value to generate an edge enhancement value;
(D) determining whether the present pixel is located in an inside region or an outside region of the image edge, wherein the inside region is close to a mid-position of the image edge, and the outside region is distant from the mid-position of the image edge;
(E) when the present pixel is located in the inside region, adjusting the edge enhancement value to generate an enhanced pixel value according to a first enhancement range, when the present pixel is located in the outside region, adjusting the edge enhancement value to generate an enhanced pixel value according to a second enhancement range, wherein the first enhancement range and the second enhancement range are related to the position of the present pixel located in the input image; and
(F) when the present pixel is located in the bright edge, combining the present pixel value with the enhanced pixel value to be an adjusted pixel value and blending the adjusted pixel value and a largest pixel value around the present pixel according to a pixel ratio to generate an output pixel, and when the present pixel is located in the dark edge, combining the present pixel value with the enhanced pixel value to be an adjusted pixel value and blending the adjusted pixel value and a smallest pixel value around the present pixel according to the pixel ratio to generate the output pixel; wherein after receiving each pixel of the input image, the image processor takes each pixel as the present pixel in sequence, calculates edge gradient values of the present pixel in multiple directions, and determines whether the present pixel is located in the image edge according to the edge gradient value; when the present pixel is located in the image edge, the image processor executes the step (B); and when the present pixel is not located in the image edge, the image processor takes the next pixel as the present pixel and re-determines whether the present is located in the image edge.

12. The electronic apparatus according to claim 11, wherein in the step of calculating whether the present pixel is located in the bright edge or the dark edge of the image edge, the image processor calculates an edge response value of the present pixel according to a response mask to determine whether the present pixel is located in the bright edge or the dark edge of the image edge.

13. The electronic apparatus according to claim 12, wherein in the step of adjusting the value according to the enhanced threshold value, when the present pixel is located in the bright edge, the image processor calculates a gradient sum according to the edge gradient value and calculates the enhanced threshold value according to the gradient sum, wherein the gradient sum is related to the intensity of the bright edge of the present pixel.

14. The electronic apparatus according to claim 12, wherein in the step of adjusting the value according to the enhanced threshold value, when the present pixel located in the dark edge, the image processor calculates a gradient sum according to the edge gradient value and calculates the enhanced threshold value according to the gradient sum, wherein the gradient sum is related to the intensity of the dark edge of the present pixel.

15. The electronic apparatus according to claim 11, wherein in the step of determining whether the present pixel is located in the inside region or the outside region of the image edge, when the present pixel is located in the bright edge of the image edge, the image processor determines whether a determination value generated by adding the present pixel and the edge enhancement value is more than the largest pixel value around the present pixel;
 if yes, the image processor determines that the present pixel is located in the outside region of the image edge; and
 if not, the image processor determines that the present pixel is located in the inside region of the image edge.

16. The electronic apparatus according to claim 15, wherein being around the present pixel indicates being within a range extending out from the present pixel by a predetermined number of pixels.

17. The electronic apparatus according to claim 11, wherein in the step of determining whether the present pixel is located in the inside region or the outside region of the image edge, when the present pixel is located in the dark edge of the image edge, the image processor determines whether a determination value generated by subtracting the edge enhancement value from the present pixel is less than the smallest pixel value around the present pixel;
 if yes, the image processor determines that the present pixel is located in the outside region of the image edge; and
 if not, the image processor determines that the present pixel is located in the inside region of the image edge.

18. The electronic apparatus according to claim 11, wherein when the present pixel is located in the inside region, the image processor sets an inside enhancement amplitude and adjusts the inside enhancement amplitude according to a distance difference between the present pixel and a central position of the input image to generate a first enhancement amplitude; and when the present pixel is located in the outside region, the image processor sets an outside enhancement amplitude and adjusts the outside enhancement amplitude according to the distance difference between the present pixel and the central position of the input image to generate a second enhancement amplitude.

* * * * *